United States Patent
Wagner et al.

(10) Patent No.: US 8,940,127 B2
(45) Date of Patent: Jan. 27, 2015

(54) RESIN COMPOSITION FOR THE MANUFACTURE HIGH GLOSS LAMINATED PANELS

(75) Inventors: Robert Alexander Wagner, Vienna (AT); Adisa Cokovic, Krems an der Donau (AT); Harald Trachsler, Rohrendorf (AT); Karin Lepedat, Vienna (AT)

(73) Assignee: Metadynea Austria GmbH, Krems (AT)

( * ) Notice: Subject to any disclaimer, the term of this patent is extended or adjusted under 35 U.S.C. 154(b) by 0 days.

(21) Appl. No.: 13/591,248

(22) Filed: Aug. 22, 2012

(65) Prior Publication Data

US 2012/0316271 A1 Dec. 13, 2012

Related U.S. Application Data

(63) Continuation of application No. PCT/EP2011/054166, filed on Mar. 18, 2011.

(30) Foreign Application Priority Data

Mar. 18, 2010 (GB) .................................. 1004538.3

(51) Int. Cl.
| | |
|---|---|
| *C09J 4/00* | (2006.01) |
| *C09J 101/00* | (2006.01) |
| *C09J 201/00* | (2006.01) |
| *B29C 65/00* | (2006.01) |
| *B31B 1/60* | (2006.01) |
| *B32B 37/00* | (2006.01) |
| *C08K 5/34* | (2006.01) |
| *C08K 5/3445* | (2006.01) |
| *B32B 7/12* | (2006.01) |
| *C08K 5/55* | (2006.01) |
| *C08L 61/32* | (2006.01) |
| *B32B 21/02* | (2006.01) |
| *B32B 21/06* | (2006.01) |
| *C08L 61/28* | (2006.01) |
| *D21H 27/22* | (2006.01) |
| *B29K 61/20* | (2006.01) |
| *B29L 7/00* | (2006.01) |
| *D21H 17/49* | (2006.01) |
| *D21H 17/51* | (2006.01) |
| *C08K 5/21* | (2006.01) |
| *C08K 5/31* | (2006.01) |
| *C08K 5/39* | (2006.01) |
| *C08K 5/405* | (2006.01) |

(52) U.S. Cl.
CPC .............. *C08L 61/32* (2013.01); *B32B 21/02* (2013.01); *B32B 21/06* (2013.01); *C08L 61/28* (2013.01); *D21H 27/22* (2013.01); *B29K 2061/20* (2013.01); *B29K 2995/0022* (2013.01); *B29L 2007/002* (2013.01); *B32B 2260/028* (2013.01); *B32B 2260/046* (2013.01); *B32B 2307/406* (2013.01); *D21H 17/49* (2013.01); *D21H 17/51* (2013.01); *C08K 5/21* (2013.01); *C08K 5/31* (2013.01); *C08K 5/39* (2013.01); *C08K 5/405* (2013.01)
USPC ........... 156/330.9; 156/60; 524/106; 524/186

(58) Field of Classification Search
USPC ......................... 156/60, 330.9; 524/106, 186
See application file for complete search history.

(56) References Cited

U.S. PATENT DOCUMENTS

| | | | |
|---|---|---|---|
| 2,633,459 A | 3/1953 | Blais | |
| 3,496,131 A | 2/1970 | Bornmann, P et al. | |
| 3,753,934 A | 8/1973 | Diethelm et al. | |
| 3,762,942 A | 10/1973 | Putnam | |
| 4,552,792 A | 11/1985 | Julian et al. | |
| 5,702,806 A | 12/1997 | O'Dell et al. | |
| 5,820,997 A * | 10/1998 | Gapud et al. ................... | 428/503 |
| 2001/0051679 A1 | 12/2001 | Scholl et al. | |
| 2002/0025426 A1 | 2/2002 | Karam | |
| 2007/0196676 A1 | 8/2007 | Schuster | |
| 2008/0199672 A1 | 8/2008 | Ruhdorfer | |
| 2008/0268273 A1* | 10/2008 | O'Brien et al. ............... | 428/528 |

FOREIGN PATENT DOCUMENTS

| | | |
|---|---|---|
| DE | 813210 C | 9/1951 |
| DE | 1025141 | 2/1958 |
| DE | 1595368 | 4/1970 |
| DE | 2637424 A1 | 2/1978 |
| FR | 2362169 A1 | 3/1978 |
| GB | 691053 | 5/1953 |
| GB | 0887923 | 11/1959 |
| GB | 1279075 | 6/1972 |
| GB | 2462619 | 2/2010 |
| RU | 2157393 C2 | 10/2000 |
| WO | WO 0061385 A1 | 10/2000 |

* cited by examiner

*Primary Examiner* — Michael Orlando
(74) *Attorney, Agent, or Firm* — Minerva Rivero; David P. Owen; Hoyng Monegier LLP

(57) ABSTRACT

A high gloss laminated panel is manufactured by applying a layer of a resin composition on a substrate layer and applying elevated pressure at elevated temperature for a time sufficient to at least partially cure the resin preferably without backcooling. The resin composition includes a melamine formaldehyde resin in water and further includes one or more additives chosen from the group of thiourea, 1-amino-2-thiourea, stabilized guanidine, thio-acetamide, or an additive.

16 Claims, No Drawings

RESIN COMPOSITION FOR THE MANUFACTURE HIGH GLOSS LAMINATED PANELS

CROSS REFERENCE TO RELATED APPLICATIONS

This application is a continuation of international application number PCT/EP2011/054166 filed on Mar. 18, 2011 and claims priority from UK application number 1004538.3 filed on Mar. 18, 2010, the contents of which are hereby incorporated by reference in their entirety.

BACKGROUND OF THE INVENTION

1. Field of the Invention

The invention relates to a process for preparing high gloss laminated panels, the resulting high gloss laminated panels, to a resin composition for use in said process and a process for the manufacture of said resin composition.

2. Description of the Related Art

Laminated panels are typically manufactured by laminating a resin impregnated paper layer onto a substrate layer, for example high-density fiberboard (HDF), medium density fiberboard (MDF) or particle board. The resin impregnated paper layer is provided to mainly decorate the substrate layer and desirably to form a smooth, glossy and durable surface layer.

A surface can generally be classified as high gloss when 70 gloss units are measured according to standard EN 14323: 2004. The industry still considers high-pressure lamination (HPL) as the benchmark requirement for obtaining high gloss laminate surfaces (above 110 gloss units). With current melamine formaldehyde (MF) resins a high gloss (above 110) and non orange peel surface cannot be achieved by standard direct pressed laminates (DPL) process technology. HPL itself is expensive and the manufacture of HPL is labour intensive and time consuming. The gloss is measured using a standard gloss meter according to ISO 2813 as described in EN 14323 section 5.13.

The reasons why DPL cannot deliver high gloss surfaces using MF resins are manifold. For example, typically the press is opened hot after pressing and the water steam which has been liberated by the condensation of the resin (from B stage in the paper to C stage in the surfacing layer) evaporates immediately thus destroying the smooth and glossy surface. This can of course be avoided, and it is known in the industry to do so, by a so called back cooling step in which the press is cooled to lower than water boiling point temperatures prior to opening but this self evidently reduces the output of the process. DPL technology as described here is nevertheless currently commercially applied by e.g. FunderMax (St. Veit/Glan, Austria).

It was found that, although MF resins are generally considered to have no flow, the resin still flows at a very limited level. The resin is flowing both in DPL and HPL from the impregnated paper into the substrate. Due to this, the typically very thin surfacing MF layer, which is responsible for achieving a good gloss level, decreases its thickness even further, enabling paper fibers come through the surfacing MF thus reducing the very high gloss. To help this somewhat, there are many bypasses used. One is to increase the resin content to a very high level which makes it cost wise unattractive. Kaindl WO 2006119950A1 describes to use densified, smoothened papers to achieve a thicker and smoother MF resin surfacing layer without drastically increasing the total resin content.

Another solution applied to both DPL and HPL could theoretically be to adjust the reactivity of the impregnation formulation at a very fast level, optionally combined with a very low volatile content of the impregnated paper which together helps a faster curing in the press and thus reducing the flow and the total amount of liberated water. Another solution could be to use cooling when press is cooled, so as to minimize the release of water, known as back cooling. Furthermore, a high degree of condensation in the resin formulation is favorable but this reduces the shelf life of the resin for the same reasons. However, all these measures together nevertheless make only a limited medium gloss level possible and high gloss is still out of reach.

Thus, there is a particular need for a process for manufacturing high gloss laminated panels, in particular there is a need for a resin composition for use in that process that at comparable solids contents and degree of condensation can provide high gloss laminated panels even in a direct pressing laminate (DPL) processes without a need for a back cooling process.

BRIEF SUMMARY OF THE INVENTION

The present invention addresses these problems by providing Process for the manufacture of a high gloss laminated panel comprising the steps of applying a layer of a resin composition on a substrate layer and applying elevated pressure at elevated temperature for a time sufficient to at least partially cure the resin preferably without back-cooling wherein the resin composition comprises a melamine formaldehyde (MF) resin in water and further comprises one or more additives chosen from the group of thiourea, 1-amino-2-thiourea, stabilized guanidine, thio-acetamide, or an additive according to formula 1:

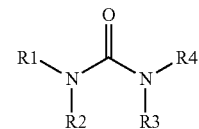

wherein R1 and R4 are an alcohol, preferably —CH$_2$OH and R2 and R3 are a polyol preferably —CH(OH)—CH(OH).

It was found that the process according to the invention provides better gloss laminate panels than any other DPL material while maintaining high output of the impregnation line, press speed (efficiency) and required properties of the surface. It was surprisingly found that the measured gloss is at least at the same level as high gloss HPL but DPL is by far cheaper because it is less labour intensive and requires only one layer of decorative paper, whereas HPL also requires several layers of paper under the decorative paper layer.

The inventors believe, without wishing to be bound by theory, that the minor amount of additive modifies the flow properties of the resin and improves the gloss value by reducing rippling on the surface of the resin layer caused by release of steam from the resin composition in the press, in particular when releasing the pressure after pressing without back-cooling.

It is surprising that addition of for example thiourea or stabilized guanidine, even in very low amounts eg 1 wt % (relative to the total resin weight) improves the gloss in a DPL process to surprisingly high levels while all other tested additives DEG, MEG, PEG 400 & 600, butylglycol, butyldiglycol, 1,4-butandiol, glycerol, sucrose, o,p-toluenesulphonic acid, 2-phenoxyethanol, □-caprolactam, various blends of the mentioned additives, and "gloss additives from the marketplace" have a negative affect on the gloss level of the final DPL. It is preferred that the above-mentioned other additives are present in only in substantial amounts, preferably less than 5 wt %, more preferably less than 2.5 wt % and most preferably less than 1 wt %. It is known that even a minor modification of MF resins with urea has a negative impact on the surface properties of the DPL. Therefore, it is surprising that the addition of thiourea does not negatively affect the surface properties, in particular water resistance and chemical resistance, of the final DPL. This was proven by the widely used and well accepted Kiton (Rhodamine B-Test) and water steam test.

DE 2637424 A1 describes a process for the preparation of highly reactive melamine formaldehyde impregnation resin which can be used in normal pressing conditions in several day pressing or at elevated temperatures in one day pressing. In DE 2637424 A1 the highly reactive resins develop during compression within a short period of time a high fluidity and fast cure. The resins should not attain during this flow interval such a low viscosity that migrates during the pressing operation from the paper to be coated into the porous wood material surface. Both at too high and too low flowability of the resins result in porous, open surfaces with very poor gloss. Good gloss is achieved in the Examples with and without thiourea. The resins are claimed to have high reactivity and on the other hand good storage stability due to the addition of caprolactam, thiourea and alkalihydrogensulphite. The lamination process in the examples involves back cooling.

U.S. Pat. No. 2,633,459 discloses a flow melamine resin composition comprising a diguanidine carbonate additive as a buffering flow promoter for producing laminates with improved transparency. The document is completely silent about improving the gloss and about the laminating technology used.

The preferred additives are thiourea or stabilized guanidine. Preferred stabilized guanidines are cyanoguanidine and guanidine carbonate. Based on this disclosure the skilled person can easily find other known stabilized guanidine compounds that are suitable for use as an additive and can easily find the optimum amount and process conditions for each additive in which a high gloss is obtained as well as a good water and chemical resistance.

In the resin composition the additive is present in an amount between 0.1 and 10 wt % (relative to the total weight of the composition), preferably between 0.5 and 5.0 wt %, more preferably between 1 and 3 wt %. The composition preferably comprises no other adhesives, in particular less than 10 wt %, preferably less than 5 wt % relative to total resin. It is further preferred that the total weight of melamine formaldehyde resin and additive is more than 85 wt % (relative to the total weight of resin in the composition), more preferably more than 90 and even more preferably more than 95 wt %. Most preferably, the resin composition comprises substantially no plastification additives, which often are added during or after cooking, because these additives were found to drastically reduce the gloss value.

In the context of this application, a melamine formaldehyde resin is considered to be a resin wherein the major part of the amine functional compound is melamine. Hence, a melamine formaldehyde resin comprises a urea modified melamine formaldehyde resin or a substantially pure melamine formaldehyde resin comprising at least 50 weight percent melamine, preferably at least 60, more preferably at least 70, even more preferably at least 80, and most preferably at least 90 weight percent melamine (weight percentage of the sum of urea and melamine). In the melamine formaldehyde resin, the formaldehyde over a melamine molar ratio preferably is between 1.4 and 2.2, preferably between 1.6 and 2.0 most preferably between 1.7 and 1.95. The resin composition preferably has a total solids content is between 40 and 100 wt. %, preferably 50-60 wt % dry solids weight and relative to the total weight of the resin composition.

The water dilutability of the resin composition preferably is between 0.5 and 2.0, preferably 0.7 to 1.5 and most preferably between 0.8 and 1.2 at 20° C. The water dilutability of the resin is a measure of the degree of condensation of the melamine formaldehyde reaction product. The water dilutability is determined by placing (at 20° C.) 20 g of the resin (to the precision of 10 mg) into an Erlenmeyer-flask. The water dilutability of the sample is determined by titration with deionized water (20° C.) until the sample becomes turbid. The amount of water added when this endpoint is reached is the water dilutability (expressed as ml water/gram resin).

The pH of the resin composition preferably is between 7.0 and 12.0, more preferably between 8.0 and 11.0 and most preferably between 8.6 and 9.8.

The invention relates to a method for the manufacture of the resin composition. The resin composition can be manufactured by two different types of procedures; a one pot reaction wherein the formaldehyde, melamine and additive are charged in different orders in order to maintain a proper reaction; and a two pot reaction wherein at least part of the additive is reacted separately with formaldehyde in order to get a pre-methylolated additive which can be used to produce a high-gloss resin by combination with a standard MF resin, preferably unmodified. Particularly good results were obtained with the two pot reaction. In a one pot reaction, the additive can generally be added before, during or after the condensation reaction between formaldehyde and melamine; so before during or after charging either or formaldehyde or melamine to the reactor. Formaldehyde is added as an aqueous solution (formalin) but preferably comprising 20-55, more preferably 30-40 wt % formaldehyde.

Particular embodiments of the process for the manufacture of the resin composition according to the invention comprise the steps of:

(a) adding formalin (an aqueous solution containing formaldehyde), charging the additive adjusting the pH between 7.0 and 12.0, dosing the melamine, heating and keeping reflux, cooling; in this order, till a specified water dilutability can be determined or (b) adding formalin, adjusting the pH, dosing the melamine, heating and keeping reflux, cooling, till a specified water dilutability can be determined, cooling to lower temperature, and then charging the additive, adjustment of solid content by water addition; in this order or (c) charging the additive, adjusting the pH, adding formalin, adjusting the pH, dosing the melamine, heating and keeping reflux, cooling; in this order, till a specified water dilutability can be determined or (d) in a first batch adding formalin, adjusting the pH, dosing the melamine, heating and keeping reflux, cooling, till a specified water dilutability can be determined, cooling to lower temperature; in this order; and separately adding formaldehyde into a second batch, diluting if necessary, adjusting the pH, dosing a part of the additive, heating and maintaining at a certain temperature and then charging the second part of the additive; cooling; in this order; or alternatively adding the additive in one part; thereafter mixing the first and the second batch.

The resin composition according to the invention can be used ideally for the manufacture of high gloss laminated panels, furniture elements and laminate flooring. The invention also relates to the use of the resin composition in a process for the manufacture of a laminated panel, in particular a direct pressed laminate (DPL), which process comprises the steps of applying a layer of the resin composition according to the invention, preferably in the form of a resin impregnated paper layer, on a substrate layer, preferably MDF, HDF or particle board, and applying elevated pressure, preferably between 15 and 50 bar at elevated temperature, preferably between 130 and 220° C. for a time sufficient to at least partially cure the resin, preferably between 7 and 60 seconds preferably in a discontinuous short cycle press.

In case the resin composition is applied as a layer of resin impregnated paper, the resin pickup preferably is between 100 and 250%, preferably between 115 and 145% (weight percent relative to the total weight of the resin impregnated paper).

Laminated panels obtainable by the process according to the invention preferably have a gloss of at least 70 gloss units or higher according to EN14323: 2004 on a high density fiberboard. The actual gloss values obtained depend apart from the chosen additive also on other composition and process conditions. However, compared with a similar unmodified resin composition (without the additive) produced under the same conditions it is possible to achieve higher gloss values at comparable water or/and chemical resistance or improved water/chemical resistance at comparable gloss levels. Preferably, the gloss value is more than 100, more preferably more than 105 and even more preferably more than 110 and most preferably more than 115 gloss units. The experiments have shown that laminated panels obtainable by a process using the resin composition according to the invention even allows in optimized conditions to achieve gloss values more than 120 gloss units on a high density fiberboard.

DESCRIPTION OF ILLUSTRATIVE EMBODIMENTS

The following is a description of certain embodiments of the invention, given by way of example only and with reference to the drawings.

Tested: hand sheet impregnation in lab (resin pick up 140%, volatiles 5.5%, formulation used for impregnation adjusted to a turbidity time of 3 min (catalyst Prefere 70 9160L) containing 0.3% wetting agent Würtz PAT 959XP, 0.1% release agent Würtz PAT 523 XP, diluted to 52% solid content, dekor paper: 78 gsm Buche Bavaria from Schattdekor)

Pilot line impregnation: same formulation and paper as above, resin content 140% and 120%, in both cases the volatile content was ~5.5% (see table below). Press: 180° C./30 bar/30 s Gloss: determined at 60° angle, producer Tasco, Japan.

A: Resin Synthesis

In MF resin synthesis, the additives can be added at various steps. This can be e.g. after formalin loading (method A) or at the end of the synthesis (method B).

According to method A, a typical resin was synthesized using 506 g 37.5% formalin (in liquid solution), charging the additive (see table 1, samples A.1-A.6), adjusting a pH 9.1-9.8 (20° C.), dosing 420 g melamine, heating to reflux and keeping at reflux for 1 hour, followed by cooling to 85-90° C., maintaining the system at this temperature till a final water dilutability of 0.9 is achieved. As soon as the water dilutability is achieved, the resin batch is cooled to 30° C., followed by adjustment of the solids by water in order to get a resin of 57.5% solid content (determined by oven method, 1.0 to 1.1 g (weighed to the nearest 0.1 mg) of resin are put into a dish according to DIN 12605 (flat bottom, diameter 35±3 mm). The sample is dried for 120 minutes at 120° C. in the lower third of a drying oven. After cooling to room temperature the weight of the residue will be determined (accuracy 0.1 mg). The solid content (%) is the weight of residue (g) divided by the weight of the sample (g) (×100%).

According to method B a typical resin was synthesized using 506 g 37.5% formalin, adjusting a pH 8.6-8.8 (20° C.), dosing 420 g melamine, heating to reflux and keeping at reflux for 1 hour, followed by cooling to 85-90° C., maintaining the system at this temperature till a final water dilutability of 0.9 (determined at 20° C.) is achieved, followed by immediate cooling, at 60° C. charging the additive (see table 2, samples B1-B6), and adjustment of the solids by water addition in order to get a resin of 57.5% solid content (oven method as above).

TABLE 1

| type | Sample | Additive | amount [g] |
| --- | --- | --- | --- |
| comparative | Comp A1 | Urea | 10 |
| comparative | Comp A2 | Urea | 30 |
| inventive | A3 | Thiourea | 5 |
| inventive | A4 | Thiourea | 10 |
| inventive | A5 | Thiourea | 50 |
| inventive | A6 | 1,3-Dimethylol-4,5-dihydroxyethylenurea DMDHEU | 10 |
| inventive | A7 | Guanidine carbonate | 30 |

TABLE 2

| Sample | Additive | amount [g] |
| --- | --- | --- |
| Comp B1 | Urea | 30 |
| B2 | Thiourea | 10 |
| B3 | Thiourea | 50 |
| B4 | 1,3-Dimethylol-4,5-dihydroxyethylenurea | 30 |
| B5 | Guanidine carbonate | 3 |
| B6 | Guanidine carbonate | 20 |

In case of guanidine carbonate a third method was applied (method C, table 3). Herein, guanidine carbonate was dissolved in 210 g distilled water, adjusted to a pH 5.8 (20° C.) with 30% sulphuric acid, stirred for 20 min, and added to 340 g 55% formalin. From here, the resin was synthesized according to method A.

TABLE 3

| Sample | Additive | Amount [g] |
| --- | --- | --- |
| C1 | Guanidine carbonate | 3 |
| C2 | Guanidine carbonate | 17 |
| C3 | Guanidine carbonate | 35 |

Moreover, in contrast to the aforementioned methods, which may be considered a "one pot" reaction, where the additives are added after methylolation of the MF resin, a fourth method may be used (method D). This method was used to methylolate thiourea outside of the MF resin methylolation; and mixing the methylolated thiourea with the methylolated MF resin in different amounts. In this method, the MF base resin was synthesized using 480 g 37.5% formalin, adjusting a pH 9.1-9.8 (20° C.), dosing 440 g melamine, heating to reflux and keeping at reflux for 1 hour, followed by cooling to 90-93° C., maintaining the system at this temperature till a final water dilutability of 1.1-1.3 is achieved (determined at 20° C.). As soon as the water dilutability is achieved, the resin batch is cooled to 30° C., followed by adjustment of the solids by water in order to get a resin of 57.5% solid content. Parallel, 250 g 37.5% formalin were diluted with water 1, adjusted to a pH 7.5-8.0 (20° C.) by means of 14% NaOH, dosing the additive amount 1(see table 4, samples D1-D2), heating to 95° C. and maintaining this temperature for 20 min, cooling to 70° C., adjusting a pH 4.5-4.7 by 5% sulphuric acid, and keeping at 70° C. for 45 minutes. At this point, additive amount 2 was added. Thereafter, the system was cooled to 30° C., and the final pH 7.5-8.2 was adjusted (14% NaOH). For impregnation, the MF base resin was mixed by weight with the sample resins D1 and D2 in various ratios (see table 5).

TABLE 4

| Sample X | Additive | Amount 1 [g] | Amount 2 [g] | water 1 [g] |
|---|---|---|---|---|
| D1 | Thiourea | 85 | 34 | 0 |
| D2 | Thiourea | 79 | 80 | 35 |

Samples S and T have been blended by weight with the mentioned MF base resin in the ratios as given in Table 5 below and after mixing diluted to 52% solid content:

TABLE 5

| sample | parts MF base resin [wt %] | parts of sample X [wt %] |
|---|---|---|
| D1.1 | 90 | 10 D1 |
| D2.1 | 80 | 20 D2 |
| D2.2 | 90 | 10 D2 |
| D2.3 | 95 | 5 D2 |
| D2.4 | 98.5 | 1.5 D2 |

B) Impregnation a) Hand Sheets:

The resins A-R as well as commercially available MF impregnation resins (Dynea Austria GmbH: Prefere 70 0562L, Prefere 70 0565L, and Prefere 70 0862L) used as comparative examples were diluted with demineralised water to a solid content of 52%.

After addition of 0.3% PAT 959/XP and 0.1% PAT 523/XP (wetting agent and release agent) both from company Würtz GmbH & Co KG) a turbidity time of 3-3.5 minutes was adjusted by addition of the latent catalyst Prefere 70 9160L (Dynea Austria GmbH). This test is used for all compositions to determine the amount of hardener necessary to cure the resin within the specified turbidity time of 3 to 3.5 min.

Determination of the Turbidity Time:

In a 400 ml beaker 300 g of resin composition were mixed with a glass rod to a homogeneous solution.

Then a variable amount of hardener Prefere 70 9160L (solution of a quaternary ammonium compound with an organic acid) was added to the resin composition using an Air Interface Pipette, so that the turbidity time was set to the above mentioned time range. The solution was mixed to a homogeneous solution with a glass rod.

10 g±0.1 g of that solution were placed in a 160×16 mm test tube.

The test tube was dipped into a 600 ml beaker glass which contains 500 ml of boiling water.

With a glass rod (diameter 4.8-5.2 mm) the solution in the test tube was stirred for exactly 30 sec. The formation of bubbles should be avoided.

The glass rod remained in the test tube, the test tube was heated without stirring.

The time between point 4 and the test mixture became white was stopped as the turbidity time.

Commercially available décor paper (70 gsm Oxford Cherry of Süddekor) was impregnated with the given formulation in the lab on basis of A4 sized hand sheets. Target settings for impregnation were resin pick up of approximately 140% respectively and volatile contents of 5-5.5%.

The resin pick up in % is calculated as follows: $((m_2-m_1)/m_1)*100[\%]$, in which $m_2$=paper weight after impregnation (B stage resin) and $m_1$=paper weight before impregnation (décor paper).

The volatile content in % is calculated as follows: $((m_2-m_3)/m_2)*100[\%]$, in which $m_2$=weight of the impregnated paper (before drying in a thermostat), $m_3$=weight of the impregnated paper after drying in a thermostat at 160° C. for 5 min (C stage resin).

These impregnates were pressed onto commercially available HDF (7 mm), applying 180° C. and 30 bar specific pressure for 30 seconds. The surface properties have been tested according to typical test methods, which are water steam test, Rhodamin B test, and gloss measurement (table 6).

The water steam test was performed similar to EN 438-2 (paragraph 24) and such that 100×100 mm panel samples were placed on top of a 250 ml Erlenmeyer flask filled with 200 ml water kept constantly boiling. The samples were exposed to the water steam for 1 hour (décor side towards the water steam and panel fixed with a 500 g weight). Thereafter, the samples were removed from the water steam, remaining water was carefully wiped off, and the samples were stored for 24 h followed by visual inspection. For judgment the scale given in EN 438-2 (paragraph 24) was used (the scale of surface appearance runs from 1 to 5, wherein 5 is best: no visible change of the surface and 1 is the worst: strong surface rupture and/or delamination).

For the Rhodamin B test, the test solution was prepared dissolving 0.2 g Rhodamin B in 1000 ml 2 M hydrochloric acid. On the décor side of the board sample a 50 mm wide watch glass having a 10 mm hole was placed with the wider side down. Through the hole the watch glass was filled with the test solution and kept on the décor surface for 1 hour. Thereafter, the watch glass was removed; the acid washed off with distilled water, remaining water was carefully wiped off. The assessment of the surface appearance was done by visual inspection and judged according to the following scale (0 is best):

| Degree of curing | Surface appearance |
|---|---|
| 0 | No colouring |
| 1 | Weak colouring |
| 2 | Moderate colouring |
| 3 | Strong colouring |
| 4 | Strong colouring and limited swelling |
| 5 | Strong colouring and strong swelling |

The degree of gloss was determined at least 1 hour after pressing using a Gloss Checker TMS-723 of Tasco Japan Co., Ltd., measured at an angle of 60°.

TABLE 6

| Sample | resin pick up [%] | volatile content [%] | gloss value | water steam test | Rhodamin B test |
|---|---|---|---|---|---|
| Comp A1 | 139.3 | 5.2 | 112 | 3 | 0 |
| Comp A2 | 139.5 | 5.2 | 112 | 2 | 1 |
| A3 | 140 | 5.3 | 117 | 5 | 0 |
| A4 | 140 | 5.1 | 119 | 5 | 0 |

TABLE 6-continued

| Sample | resin pick up [%] | volatile content [%] | gloss value | water steam test | Rhodamin B test |
|---|---|---|---|---|---|
| A5 | 140 | 5.4 | 123 | 4 | 1 |
| A6 | 139.7 | 5.2 | 117 | 5 | 0 |
| A7 | 139.5 | 5.4 | 123 | 5 | 0 |
| Comp B1 | 139.1 | 5.1 | 105 | 2 | 1 |
| B2 | 139.3 | 5 | 106 | 4 | 0 |
| B3 | 139.6 | 5.2 | 110 | 3 | 0 |
| B4 | 139.9 | 5.3 | 108 | 4 | 0 |
| B5 | 139.6 | 5.2 | 120 | 4 | 0 |
| B6 | 140 | 5.1 | 118 | 4 | 0 |

KG) a turbidity time of 3-3.5 minutes was adjusted by addition of the latent catalyst Prefere 70 9160L (Dynea Austria GmbH).

Commercially available décor paper (78 gsm Buche Dekor of Schattdekor) was impregnated with the given formulation on the pilot line. For resin pick ups and volatile content, see table 7.

These impregnates were pressed onto commercially available HDF (7 mm) and particle board (16 mm), applying 180° C. and 30 bar for 30 seconds. The surface properties have been tested according to typical test methods, which are water steam test, Rhodamin B test, and gloss measurement as described above (table 7).

TABLE 7

| Sample | % flexibiliser added to trough formulation | resin pick up [%] | volatile content [%] | pilot line speed [m/min] | substrate | gloss value | water steam test | Rhodamin B Test |
|---|---|---|---|---|---|---|---|---|
| A4 | none | 137 | 5.5 | 3.5 | HDF | 123 | 5 | 0 |
| | none | 137 | 5.5 | 3.5 | particle board | 122 | 5 | 0 |
| | none | 120 | 5.7 | 16 | HDF | 120 | 5 | 1 |
| | none | 120 | 5.7 | 16 | particle board | 120 | 5 | 1 |
| | 0.5% PAT 956 AXN | 137 | 5.5 | 3.5 | HDF | 119 | 5 | 0 |
| | 0.5% PAT 956 AXN | 120 | 5.5 | 16 | HDF | 119 | 5 | 1 |
| | 0.5% WIZ Alton ES 911 | 137 | 5.5 | 3.5 | HDF | 119 | 5 | 0 |
| | 2.5% PEG 400 | 120 | 5.6 | 3.5 | HDF | 115 | 5 | 1 |
| | 2.5% PEG 400 | 120 | 5.6 | 3.5 | particle board | 115 | 5 | 1 |
| | 5% Diethyleneglycol | 121 | 5.6 | 3.5 | HDF | 113 | 4 | 1 |
| COMP E | none | 122 | 5.6 | 4.6 | HDF | 104 | 5 | 1 |
| | none | 122 | 5.6 | 4.6 | particle board | 94 | 5 | 1 |
| COMP F | none | 120 | 5.5 | 4.6 | HDF | 111 | 5 | 0 |
| | none | 120 | 5.5 | 4.6 | particle board | 108 | 5 | 0 |
| C3 | none | 138 | 5.4 | 3.5 | HDF | 123 | 5 | 0 |
| | none | 138 | 5.4 | 3.5 | particle board | 122 | 5 | 0 |
| | none | 120 | 5.6 | 10 | HDF | 120 | 5 | 1 |
| | none | 120 | 5.6 | 10 | particle board | 120 | 5 | 1 |
| | 5% Diethyleneglycol | 122 | 5.5 | 3.5 | HDF particle | 113 | 4 | 1 |
| | 5% Diethyleneglycol | 122 | 5.5 | 3.5 | board | 112 | 4 | 1 |

TABLE 6-continued

| Sample | resin pick up [%] | volatile content [%] | gloss value | water steam test | Rhodamin B test |
|---|---|---|---|---|---|
| C1 | 139.7 | 5.3 | 115 | 5 | 0 |
| C2 | 140.1 | 5.2 | 119 | 5 | 0 |
| C3 | 139.9 | 5.1 | 120 | 5 | 0 |
| D1 | 139.5 | 5.3 | 122 | 4 | 0 |
| D1.1 | 139.7 | 5.2 | 123 | 4 | 1 |
| D2.1 | 139.8 | 5.4 | 123 | 4 | 0 |
| D2.2 | 140 | 5.2 | 120 | 5 | 0 |
| D2.3 | 140 | 5.2 | 120 | 5 | 0 |
| D2.4 | 139.6 | 5.3 | 118 | 5 | 0 | b) Pilot Impregnation Line, Décor Paper

For impregnation at a semi technical scale at Dynea's pilot impregnation line using a two stage saturation process resin formulations A4, C3 and Prefere 70 0562L (sample COMP E) and Prefere 70 0862L (sample COMP F) have been used. For the trials, the resins were diluted to a solid content of 52% with deionised water. After addition of 0.3% PAT 959/XP and 0.1% PAT 523/XP (both from company Würtz GmbH & Co c) Pilot Impregnation Line, Manufacture of "Liquid Overlay"

In these trials, resin formulations A4, COMP B1, and C3 were compared with Prefere 70 0562L (sample COMP E) as reference resin. Paper: 25 gsm ADO No. 6 (Glatfelter). Resin formulation used for core saturation: Resin used at 57.5% solid content (Prefere 70 0562L was diluted to this solid content), addition of 0.2% PAT 959/XP and 0.2% PAT 523/XP, turbidity time adjusted to 4 min 10 seconds by addition of required amount of Prefere 70 9160L.

Resin formulation used for ARP: Resin used at 57.5% solid content (Prefere 70 0562L was diluted to this solid content), addition of 0.2% PAT 959/XP and 0.2% PAT 523/XP, admixing of corundum (Treibacher ZWSK 220; ratio resin:corundum=2:1), turbidity time adjusted to 5 min 05 seconds by addition of required amount of Prefere 70 9160L.

The overlay paper was then pressed on HDF using a standard impregnated décor paper (Technocell black, 80 gsm base weight, 100% resin pick up, 6.3% volatile content) and applying press conditions of 180° C., 30 bar, 30 seconds.

The transparency was assessed by visual inspection and judged in comparison to the reference liquid overlay material which was pressed seamless to the sample material on the same board. Scale:

| result | transparency |
| --- | --- |
| 0 | Very much better than reference |
| 1 | Much better than reference |
| 2 | Better than reference |
| 3 | Equivalent to reference |
| 4 | Worse than reference |
| 5 | Much worse than reference |

The water steam test and gloss measurement were carried out as described above (results, see table 8).

TABLE 8

| sample | resin pick up core [%] | resin pick up final [gsm] | volatile content final [%] | gloss value | water steam test | transparency |
| --- | --- | --- | --- | --- | --- | --- |
| A4 | 77 | 140 | 7 | 120 | 5 | 3 |
| COMP B1 | 78 | 140 | 7.1 | 110 | 2 | 4 |
| C3 | 78 | 140 | 7 | 120 | 5 | 3 |
| COMP E | 77 | 141 | 7.1 | 104 | 5 | reference |

The examples clearly show that with the resin composition according to the invention a high gloss value can be obtained combined with a high water resistance and chemical resistance. Thus, the invention has been described by reference to certain embodiments discussed above. It will be recognized that these embodiments are susceptible to various modifications and alternative forms well known to those of skill in the art. For example, the resin composition may be modified to comprise effective amounts of a combination of additives such as thiourea, thioamides, DMDHEU or stabilized guanidine or obvious derivatives thereof having the same functionality.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A process for the manufacture of a high gloss laminated panel comprising the steps of applying a layer of a resin composition on a substrate layer and applying elevated pressure between 15 and 50 bar at elevated temperature between 130 and 220° C. for a pressing time between 7 and 60 seconds to at least partially cure the resin composition without back-cooling wherein the resin composition comprises a melamine formaldehyde resin in water and further comprises one or more additives chosen from the group of thiourea, 1-amino-2-thiourea, stabilized guanidine, thio-acetamide, or an additive according to formula 1:

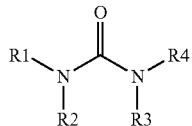

Formula 1 wherein R1 and R4 are an alcohol, and R2 and R3 are a polyol.

2. The process according to claim 1, wherein the additive is present in an amount between 0.1 and 10 wt % relative to the total weight of the composition.

3. The process according to claim 1, wherein R1 and R4 are —CH$_2$OH and R2 and R3 are —CH(OH)—CH(OH).

4. The process according to claim 1, the resin having a water dilutability between 0.5 and 2.0 at 20° C.

5. A process for the manufacture of a high gloss laminated panel according to claim 1 wherein R1 and R4 are an alcohol, and R2 and R3 are a polyol in an amount sufficient to achieve gloss improvement, between 0.5 and 5.0 wt %, and wherein the total weight of melamine formaldehyde resin and additive is more than 90 wt % relative to the total weight of the resin and wherein the water dilutability is between 0.5 and 2.0 at 20° C.

6. The process according to claim 1, wherein the resin composition is applied in the form of a resin impregnated paper layer on a substrate layer.

7. The process according to claim 6, wherein the substrate layer comprises high-density fiberboard, medium-density fiberboard or particle board.

8. The process according to claim 1, wherein the panel is manufactured in direct pressing lamination or discontinuous short cycle pressing.

9. The process according to claim 1, wherein the resin composition is applied as a layer of resin impregnated paper, wherein the resin pickup is between 100 and 250% weight percent relative to the total weight of the resin impregnated paper.

10. The process according to claim 1, wherein the additive is thiourea or stabilized guanidine, and wherein the stabilized guanidine comprises at least one of cyanoguanidine and guanidine carbonate.

11. The process according to claim 1, wherein the total weight of melamine formaldehyde resin and additive is more than 90 wt % relative to the total weight of the resin.

12. The process according to claim 1, wherein the melamine formaldehyde resin comprises substantially no other additives.

13. The process according to claim 1, wherein the formaldehyde over a melamine molar ratio is between 1.4 and 2.2.

14. The process according to claim 1, wherein the melamine formaldehyde resin is a urea modified melamine formaldehyde resin or a substantially pure melamine formaldehyde resin comprising at least 50 weight percent melamine weight percentage of the sum of urea and melamine.

15. The process according to claim 1, wherein the total solids content of the resin composition is between 40 and 100 wt. % dry solids weight and relative to the total weight of the resin composition.

16. The process according to claim 1, wherein the pH is between 7.0 and 12.0.

* * * * *